Patented Oct. 17, 1933

1,931,197

UNITED STATES PATENT OFFICE 1,931,197

MANUFACTURE OF METALLIFEROUS SULPHURIZED PHENOL DERIVATIVES

Valentin Kartaschoff, Basel, Switzerland, assignor to firm Chemical Works Formerly Sandoz, Basel, Switzerland No Drawing. Application March 9, 1931, Serial No. 521,399, and in Germany March 15, 1930

11 Claims. (Cl. 260—18)

It is known that metalliferous sulphurized derivatives of phenols may be prepared by heating phenols with metals of the ammonium sulphide and hydrogen sulphide groups and their salts in presence of sulphur and an alkali.

It has now been found that similar compounds can be prepared by heating phenols with sulphur in presence of alkali metal salts of such acids that contain in the acid residue one or two metals of the ammonium sulphide and hydrogen sulphide group.

Such alkali metal salts are for instance alkali metal-stannates, -sulphostannates, -antimonites, -sulphantimoniates, -pyroantimonites, -aluminates, -arsenites, -arseniates, -chromates, -plumbites, -vanadates, zinkates, -molybdates and the like and also oxygen- and sulphur-containing complex salts like luteo-sodiumarsenosotungstate, sodium-chromimolybdate or double-salts containing arsenic and antimon, arsenic and bismuth and others.

As phenols the following compounds may be used: phenol, its homologues and substitution products such as chlorophenols, phenolsulphonic acids, phenol-carboxylic acids, resorcine and others, naphthols and their substitution products such as chloronaphthols, naphthol carboxylic and -sulphonic acids.

To carry out the improved process mixtures consisting of phenols, sulphur and alkalimetal salts of the above cited metalliferous acids are heated in presence or in absence of water or suitable organic solvents, whereby a strong evolution of hydrogensulphide takes place. The obtained melt is composed of a mixture of the free thioacids and their alkali metal salts and can easily be transformed into its alkalimetal salts by dissolving it in a suitable quantity of an alkali and salting out from the solution or evaporating the same to dryness.

The relative proportions of phenols, sulphur and alkalimetal salts of the metalliferous acids may be varied within wide limits.

The metalliferous thiophenol derivatives prepared according to this improved process are in dry state more or less colored powders, soluble in water and in alkaline solutions in form of their alkalimetal salts. On addition of mineral acids to such solutions the more or less colored insoluble free thioacids are precipitated and on addition of earth alkali metal or heavy metal salts insoluble precipitations are observed. The products prepared according to the described process possess mordanting, tanning and reserving properties and may further be employed as insecticides and as intermediate products for the manufacture of dyestuffs and pharmaceutical products.

The following examples, whilst being not limitative, illustrate the process, the parts being by weight:

Example 1

90 parts of phenol, 30 parts of sulphur, 27 parts of sodium stannate and 30 parts of water are mixed together and heated for 40 hours at a temperature of about 130° C. The obtained thick paste after cooling down to 100° C. is treated under good stirring with a solution of 25 parts of sodium carbonate in 300 parts of water and boiled, whereby it is completely dissolved. The solution is allowed to cool down and the condensation product is isolated by salting out and is then dried.

The greyish powder thus obtained easily dissolves in water, yielding a greenish-grey opalescent solution, which becomes clear on addition of alkali. On addition to its dilute solution of dilute acetic acid no precipitation occurs, but on addition of mineral acids the free thioacid precipitates in form of a yellow precipitation. With ferrichloride it yields a grey-blue and when treated with bromine a dark brown precipitation.

The new product possesses the property to protect wool against taking up substantive and acid dyestuffs and may also be used instead of tannin for fixing basic dyestuffs on textile fibres or substrata.

Example 2

A mixture consisting of 90 parts of phenol, 30 parts of sulphur, 22,5 parts of sodiumsulphantimoniate and 20 parts of water is heated for 48 hours under a reflux condenser at 114° C. The obtained thick paste is then diluted with water, treated with water steam in order to eliminate the excess of phenol, and the milky solution thus obtained is boiled after addition of 13 parts of a caustic soda solution of 35° Bé. until it becomes completely clear, and is thereupon evaporated to dryness.

The obtained grey powder is easily soluble in water to a clear yellowish solution. On addition to its dilute aqueous solutions of dilute acetic acid a yellowish opalescent solution is obtained, but on addition of mineral acids it yields a yellow precipitate of the free thioacids. With ferrichloride it yields a violet grey and when treated with bromine a brownish grey precipitation.

The antimony containing product obtained as above described yields with basic dyestuffs clear and insoluble lakes and may advantageously be used instead of tannin.

Example 3

A mixture consisting of 90 parts of phenol, 64 parts of sulphur and 41 parts of sodiumaluminate is heated for 24 hours under a reflux condenser at 180–210° C. The obtained thick mass is diluted with water and treated at the boiling point until it is completely dissolved with the necessary amount of sodium carbonate or sodium hydroxide. The condensation product is thereupon isolated from the solution in the usual way.

In dry state it constitutes a brownish-olive powder easily soluble in cold water to a clear yellowish-brown solution. On addition to its dilute aqueous solution of dilute acids the free thioacids are precipitated in form of greyish flocks; with ferrichloride it yields a reddish black and when treated with bromine a brownish black precipitation.

The new product possesses the property of becoming fixed on cellulosic fibres without dyeing them and to act as mordant for basic dyestuffs.

What I claim is:—

1. A process for the manufacture of metalliferous sulphurized phenol derivatives, consisting in heating a phenol with sulphur in presence of alkalimetal salts of such acids that contain in the acid residue polyvalent metals containing partial valences.

2. A process for the manufacture of metalliferous sulphurized phenol derivatives, consisting in heating a phenol with sulphur in presence of an alkalimetal stannate.

3. A process for the manufacture of metalliferous sulphurized phenol derivatives, consisting in heating phenol with sulphur in presence of sodium stannate.

4. A process for the manufacture of metalliferous sulphurized phenol derivatives, consisting in heating a phenol with sulphur in presence of an alkalimetal sulphantimoniate.

5. A process for the manufacture of metalliferous sulphurized phenol derivatives, consisting in heating phenol with sulphur in presence of sodium-sulphantimoniate.

6. A process for the manufacture of metalliferous sulphurized phenol derivatives, consisting in heating a phenol with sulphur in presence of an alkalimetalaluminate.

7. A process for the manufacture of metalliferous sulphurized phenol derivatives, consisting in heating phenol with sulphur in presence of sodiumaluminate.

8. The metalliferous sulphurized derivatives of phenols, which are easily soluble in alkaline solutions and in water, yielding white, brown to black precipitations on addition of mineral acids and difficultly soluble compounds with earth alkali metal and heavy metal salts and which possess mordanting, tanning and reserving properties and may be used as insecticides and as intermediates for the production of dyestuffs and pharmaceutical preparations.

9. The tin-containing sulphurized phenol derivative, obtained from phenol, sulphur and sodium stannate, which constitutes in dry state a greyish powder, easily soluble in water with a greenish-grey coloration and which is precipitated from its dilute solutions by sulphuric acid, yielding yellow precipitations, but is stable against dilute organic acids and yields with ferrichloride a grey-blue and on addition of bromine a dark brown precipitation and with basic dyestuffs insoluble lakes and which possesses the property of protecting animal fibres against the taking up of substantive and acid dyestuffs.

10. The antimony-containing sulphurized phenol-derivative, obtained from phenol, sulphur and sodium sulphantimoniate, which constitutes in dry state a grey powder easily soluble in water with a yellowish coloration and which is precipitated from its dilute solutions by sulphuric acid, yielding a yellow precipitation, but is stable against dilute organic acids and yields with ferrichloride a violet-grey and on addition of bromine a brownish-grey precipitation and which gives with basic dyestuffs clear and insoluble lakes.

11. The aluminium-containing sulphurized phenol-derivative, obtained from phenol, sulphur and sodium aluminate, which constitutes in dry state a brownish-olive powder easily soluble in water with a yellowish-brown coloration and which is precipitated from its dilute solutions by means of acids, yielding a greyish precipitation, yield with ferrichloride a reddish-black and on addition of bromine, a brownish-black precipitation and which gives with basic dyestuffs clear and insoluble lakes.

VALENTIN KARTASCHOFF.